United States Patent
DeFabritis et al.

[11] Patent Number: 6,134,364
[45] Date of Patent: Oct. 17, 2000

[54] OPTICAL FIBER RIBBON

[75] Inventors: Raymond Peter DeFabritis, Lilburn; Kenneth Wade Jackson, Snellville; Kariofilis Konstadinidis, Decatur; Shahabuddin Siddiqui, Lawrenceville; Neil Wilbur Sollenberger, Duluth; Carl Raymond Taylor, Lawrenceville; John Michael Turnipseed, Lilburn, all of Ga.

[73] Assignee: Lucent Technologies Inc., Murray Hill, N.J.

[21] Appl. No.: 09/176,715

[22] Filed: Oct. 21, 1998

Related U.S. Application Data

[63] Continuation-in-part of application No. 09/154,670, Sep. 18, 1998.

[51] Int. Cl.$^7$ ........................................... G02B 6/44
[52] U.S. Cl. ........................................... 385/114
[58] Field of Search ........................... 385/100, 109, 385/112, 114, 102; 156/344, 584; 428/375

[56] References Cited

U.S. PATENT DOCUMENTS

| | | | |
|---|---|---|---|
| 3,920,432 | 11/1975 | Smith | 65/4 |
| 4,147,407 | 4/1979 | Eichenbaum et al. | 350/96.34 |
| 4,828,349 | 5/1989 | Nakasuji | 350/96.33 |
| 4,900,126 | 2/1990 | Jackson et al. | 350/46.23 |
| 5,457,762 | 10/1995 | Lochkovic et al. | 385/114 |
| 5,600,750 | 2/1997 | Beasley, Jr. et al. | 385/114 |
| 5,611,017 | 3/1997 | Lee et al. | 385/114 |
| 5,621,842 | 4/1997 | Keller | 385/114 |

FOREIGN PATENT DOCUMENTS 2 168 230  11/1985  United Kingdom.

*Primary Examiner*—Hemang Sanghavi

[57] ABSTRACT

An optical fiber ribbon in which a plurality of optical fibers are held in an array has a matrix material for bonding to the fibers to form the ribbon. The matrix material has certain characteristics which serve to enhance fiber access, among which are an elastic modulus from 600 to 1200 MPa at room temperature, from 100 to 280 MPa at 100° C., and from 15 to 45 MPa at temperatures greater than 170° C. The matrix material swells in ethanol more than 15% by volume within 20 minutes, and is virtually immune to the action of cleaning solvents. The matrix material has a surface tension of 20–35 mJ/m$^2$ as do the color coding inks which identify the fibers.

4 Claims, 3 Drawing Sheets

OPTICAL FIBER RIBBON

RELATED APPLICATIONS

This application is a continuation-in-part of U.S. patent application Ser. No. 09/154,670 of Chandraiah et al., filed Sep. 9, 1998.

FIELD OF INVENTION

This invention relates to accessing optical fibers in an optical fiber ribbon and, more particularly, to a ribbon bonding matrix for the optical fiber ribbon for facilitating access to the fibers in the ribbon.

BACKGROUND OF THE INVENTION

Optical fiber cable development, wherein the cable is capable of multi-channel transmission, has led to the use of bonded arrays of fibers which form a planar ribbon, and to stacks of ribbons within a core tube or sheath. In a typical ribbon array, a plurality of fibers, e.g., twelve, are held in spaced position parallel to each other by a suitable matrix, a configuration which simplifies construction, installation, and maintenance by eliminating the need for handling individual fibers. Thus, the splicing and connecting of the individual fibers can be accomplished by splicing and connecting the much larger ribbons provided that the fiber positions in the ribbon are precisely fixed and maintained.

In the prior art, numerous ribbon arrays have been proposed, all directed at achieving the aforementioned alignment as well as being directed to other aspects of ribbon construction and geometry. Among these is the adhesive sandwich ribbon (ASR) as disclosed in U.S. Pat. No. 4,147,407 of Eichenbaum, et al. and 3,920,432 of Smith. Such ribbon structures have proven to be easy to manufacture, rugged, and compact, and suitable for mass splicing. However, the use of adhesive tapes to form the sandwich necessitates a slow-down in the processing speed during manufacture and in an increased cost of the finished product, as well as the added loss to the fibers.

In U.S. Pat. No. 4,900,126 of Jackson, et al., the disclosure of which is incorporated herein by reference, there is shown a bonded optical fiber ribbon which comprises a coplanar array of longitudinally extending parallel optical fibers in contact with each other. Each fiber is enclosed in inner and outer layers of coating materials and has a color identifier for differentiating each fiber from the other fibers. The inner layer comprises an ultra-violet curable bonding material having a modulus of approximately 1 MPa and an outer layer of an ultra-violet curable bonding material having a modulus of approximately 1 GPa for mechanical protection. With the fibers disposed in a parallel array, interstices are created between the fibers themselves and between the fibers and the envelope of the ribbon, which is a matrix formed of an ultra-violet curable bonding material having a modulus that is less than the modulus of the outer coating layer on the fiber and which is greater than the modulus of the inner coating layer. The matrix material fills the interstices and bonds the fibers together and to the envelope to form a completed ribbon. The modulus and the surface characteristics of the matrix material and its bond to the color identifier on each fiber are such that interfiber and inter-ribbon movement can occur, thus the ribbons in a stack can slide relative to each other when the cable is bent and also that accessing of individual fibers is possible. The ribbons may be stacked such that eighteen ribbons, for example, having twelve fibers each, may be enclosed within a core tube to form the core of an optical fiber cable having two hundred and sixteen fibers, or, if preferred, channels. The core tube itself has an outside diameter (O.D.) of approximately 0.6 inches. Such an arrangement, which is in widespread use today, has proved adequate for most present day applications, but it imposes a definite upper limit on the numbers of fibers available and their individual identification and their accessibility.

There is, today, an ever-increasing demand for increased optical fiber cable capacity which is expected to continue into the foreseeable future. Higher fiber count cables and higher fiber packing densities are under constant and ongoing study and development. Extremely high fiber count cables have been proposed that use downsized fiber coating aimed at increasing packing density, however, the long term reliability, engineering, and operational characteristics are not, as yet, fully understood. Hence, an increase in the number of fibers, and, in turn, an increase in packing density, in a standard sized cable and with fibers having the standard thickness of fiber coating, is greatly to be desired. In an article entitled "A Modular Ribbon Design For Increased Packing Density of Fiber Optical Cables" by K. W. Jackson, et al., International Wire & Cable Symposium Proceedings 1993 at pages 20 through 27, the disclosure of which is incorporated herein by reference, there are given the results of a study of the feasibility of increasing the fiber packing density in a high fiber count cable. The cable design concept disclosed therein is based upon a modular structure of the ribbons used in the cable, and it is determined that the packing density for existing cable designs can be increased by as much as thirty to fifty percent. The ribbon structure proposed in that article comprises, for example, an array of sixteen fibers in side by side contacting relationship and divided, as by color coding of the fibers, into two eight fiber modules which, in turn, can be divided into four fiber modules. Each of the ribbons to be stacked within the cable bears, on its surface, identifying alphanumeric numbers. Thus, each fiber within each module in the stack is uniquely identified by two identifiers, i.e., color and ribbon number.

As pointed out in the aforementioned Jackson et al. patent, the color identifier material of each of the fibers should not be removed from the fiber when the bonding material is removed to access the fibers. Thus, the matrix material of the bonded ribbons is selected to have an interfacial bonding characteristic such that the bond interface of the matrix material to the coloring material is weaker than the bonding interface of the coloring material to the outermost coating on the optical fiber. In at least one embodiment of the invention of that patent, a release agent is applied over the coloring material prior to application of the matrix bonding material. There remains a problem, however, in breaking out separate modules from the ribbon, and individual fibers from the module. In general, when it is desired to break out one or more modules from the ribbon, and one or more fibers from the module, a matrix cutting tool is used. Such a tool usually comprises a metallic blade having a cutting edge for slicing through the matrix, however, with such a tool extreme care must be exercised to avoid nicking or otherwise damaging the fiber or fibers adjacent to the cut. Where, as is the case with the ribbon of the aforementioned Jackson et al. patent, the individual fibers are in actual contact with each other, the straight cutting edge of the blade is almost certain to contact the fiber, and avoidance of damage is extremely difficult. This problem is compounded by the fact that most such "breakouts" are performed in the field, under less than ideal conditions, and the installer or splicer is forced to proceed slowly with extreme care. In addition, where, in a sixteen fiber ribbon, for example, the ribbon is divided into four modules of four fibers each, it is quite difficult to identify the line of separation between modules, and to cut along that line.

In breaking out individual fibers, it is desirable that the installer or splicer remove all matrix material from each individual fiber, a process which can consume an inordinate amount of time and is, therefore, economically undesirable.

Heretofore, breakout of fibers from a ribbon has, in most cases, necessitated the deactivation of the fibers to be broken out, whereas it is desirable that the breakout be performed with actively transmitting fibers, thus eliminating down time. However, bit errors can be introduced into an actively transmitting fiber if the access method introduces dB loss that begin to approach the system design margin. The total number of errors introduced will depend upon the magnitude or duration of the induced loss, the bit rate in the fiber, and the system margins. Moreover, with time, the system design margin also tends to be reduced, which further exacerbates the problem. Inadvertent bending of fibers due to handling during re-entry of splice points or other re-entry points can cause enough loss for a long enough period of time to cause serious system errors. In a gigabit transmission system, a high loss resulting from fiber bending for only fifty milliseconds could cause the loss of millions of bits. Heretofore, the prior art arrangements and methods of accessing active fibers from the midspan of a ribbon can easily introduce sharp bends into the fibers in the ribbon being accessed, thereby introducing a large number of errors into the transmitted bit stream. A common measure of transmission quality of, for example, the fibers in a fiber ribbon is the bit error rate (BER) which is the probability of incorrect identification of a bit by the receiver apparatus. A BER of $10^{-9}$ is a widely used specification for most commercial systems and corresponds to an average probability of one incorrectly identified bit per one billion bits transmitted. Midspan access methods that generate small fiber bend radii can introduce errors in the bit stream that far exceed the desired BER. Heretofore, in prior art arrangements for accessing the fibers, the methods used to do so rely upon the skill and judgment of the person performing the operation, hence, such techniques are highly unreliable.

In practice, typically, a ribbon is 400 microns ($\mu$) or greater in thickness and contains, generally, fibers that are approximately $250\mu$ in diameter. A desideratum from the standpoint of space limitations, flexibility, ready fiber access, and economy of materials is to use "thin" ribbons of $330\mu$ or less. Most matrices today do not permit the "thin" ribbon configuration. Further, present day matrices often yellow or cloud up with aging, whereas transparency is most desirable.

Strippability of a fiber ribbon depends also upon the matrix which functions as the ribbon bonding material. Thus, a properly constituted matrix bonding material is highly desirable. Commercial ribbon stripping tools are designed to operate at temperatures between 75° C. and 160° C. The modulus of the matrix in that range is one of the factors affecting ribbon stripping. In general, a higher matrix modulus is desirable for strippability, especially when using stripping tools or machines. This is especially important for ribbon designs where the fiber access method requires peeling the matrix off the fibers with the aid of a tape. In such designs, the adhesion between the ribbon matrix and the colored fiber surface must be low so that the matrix can be removed without disturbing the fiber coatings. A high matrix modulus in the temperature range where stripping tools operate makes it possible to overcome the low adhesion required for fiber access by tape methods. However, low matrix/fiber adhesion can adversely affect the robustness of the ribbon during handling and splitting into sub-units that is usually done at room temperature conditions. Thus, the adhesion between the matrix and the fiber has to be optimized to balance the needs for easy fiber access and sub-unit robustness. Ribbon strippability can then be ensured by a matrix bonding material that has the right mechanical properties in the temperature where stripping is performed.

SUMMARY OF THE INVENTION

The present invention is an optical fiber ribbon with a matrix of ribbon bonding material which facilitates high ribbon strippability, easy access of one or more fibers in an actively transmitting fiber ribbon, and ribbon separation into integral robust sub-units.

The optical fiber ribbon may have, for example, twelve optical fibers arrayed in a plane in side-by-side relationship and color coded, as pointed out in the co-pending U.S. patent application Ser. No. 08/788,781 of Brown et al. and as is shown in U.S. Pat. No. 4,900,126 of Jackson et al. A matrix bonding material encases the fibers to form the ribbon. The matrix bonding material is a UV curable bonding material comprising a resin, a diluent, and a photoinitiator. As will be more apparent hereinafter, the surface energies of the color coding inks and the matrix material are such that the adhesion therebetween is not as great as the adhesion of the ink to the fiber coating. As a consequence, the matrix may be separated from the fiber without disturbing the ink coating thereon.

The bonding matrix, in order to provide ready access to the fibers and to have a gradual and predictable response to ambient conditions, such as temperature changes, has the following properties:

a) an elastic modulus at room temperature of 600–1200 MPa (Mega Paschals);

b) an elastic modulus at 100° C. of 100–280 MPa;

c) an elastic modulus of temperatures greater than 170° C. of 15–45 MPa;

d) a glass transition temperature greater than 100° C.;

e) the matrix swells in ethanol more than 15% by volume at least to a swell plateau;

f) the matrix reaches the percent swell plateau in less than twenty minutes but more than one minute;

g) the matrix swells less than 5% by volume after 24 hours in commercially available cable cleaning solvents;

h) the surface tension of the matrix is 20–35 $mJ/m^2$; and for the inks:

i) the surface tension of the color coding inks is 20–35 $mJ/m^2$; and j) the residual acrylate unsaturation (RAV) of the UV colored fiber surface is 2–17%. (The amount of ink that has not reacted).

The ribbon bonding material of the invention preferably is a UV curable bonding material which is a mixture, as noted hereinbefore, comprising a resin, a diluent, and a photoinitiator. The resin includes an aliphatic or aromatic urethane acrylate and/or an epoxy acrylate/methacrylate. The diluent preferably comprises a monofunctional or multifunctional acrylic acid esters having a molecular weight of 100–1000 Dalton. For the photoinitiator, the composition may include ketonic compounds such as 1-hydroxycyclohexyl phenyl ketone, diethoxyacetrophenone, acteophenone, benzophenone, henzvin, authraquinone, and benzil dimethyl ketal. In a typical composition, the bonding matrix may include 50–90 percent weight resin, 5- to 10 percent diluents, and 1 to 10 percent photoinitiator. Additives containing silicon (Si) or fluorine (F) atoms may be added to improve the release properties of the bonding material. The fiber color coatings (ink) comprise a mixture similar to the foregoing with the addition of pigments to achieve the desired color.

With the matrix of the invention, fibers can be accessed in midspan or at the end thereof using glue and tape, ethanol and tape, or ethanol gel, with the fiber coatings (colored ink, primary, secondary) remaining intact during fiber access. With the matrix of the invention, the ribbon can be stripped in preparation of mass fusion splicing and also can be separated into integral robust sub-units in midspan or at the end of branching.

The method of accessing fibers in a fiber ribbon wherein the fibers are transmitting signals comprises, for example, the steps of treating the area to be accessed with an ethanol gel or by immersion in ethanol or other suitable agent for a specific time to swell and soften the matrix and to weaken the bond between the matrix material and the ink or dye identifiers on the individual fiber; placing the ribbon so treated on a double-sided adhesion tape on a flat surface; attaching a pulling member, such as a card or a tape, to the matrix material; and peeling the matrix on the one side of the ribbon from the ribbon by pulling it with the card with a slight back tension; turning the ribbon over and placing it on a double sided adhesive tape on the flat surface and peeling the second matrix side therefrom. With suitably low adhesion between the swollen and softened matrix and the colored fibers, a variation of this embodiment involves dispensing with the attaching card or tape and simply pulling the ribbon itself from the adhesive, thereby leaving the matrix attached to the adhesive. The operation is then repeated for the second matrix side. Alternatively, a thin spatula-like member such as a card can be interposed and slid beneath the ribbon to separate it from the underlying attached matrix.

Alternatively, the ribbon area is treated with ethanol and is then laid on the flat surface; the exposed surface of the matrix is then stroked with a textured pad or cloth to remove the matrix; and the ribbon is then turned over and the second matrix side is removed by stroking with the textured pad.

In both methods, the fiber or fibers remain flat and substantially straight throughout, hence, there is negligible bending thereof, either as an involved step, or by accident. Hence, the possibility of an increase in BER is minimized.

Instead of a flat surface, as described in the first embodiment, a convex-curved surface whose radius of curvature is considerably greater than the critical fiber bend radius could be used. A variation of the foregoing would be to hold the ribbon mechanically against the curved surface and remove the matrix from the top surface of the ribbon by using a suitable attaching member such as a tape or other flexible substrate.

As pointed out hereinbefore, other methods, other accessing methods such as glue and tape, or ethanol and tape may also be used.

In practice, it has been found that a first step in the process of the invention, a pre-wipe of the matrix of the ribbon firmly with textured pad three or four times prior to treating the matrix enhances the rate at which the swelling/softening agent diffuses into the matrix, thereby reducing the time required to access the fibers. This pre-wipe apparently introduces stresses and cracks in the matrix that allow more rapid penetration of the swelling/softening agent therein.

The method of splitting the ribbon into integral sub-units at the end comprises the steps of separating the desired number of fibers by hand to a length of less than a quarter of an inch and using a dental floss tool to propagate the split up to the desired length. The method of splitting the ribbon into integral sub-units in midspan comprises the steps of using a mechanical tool to split the ribbon at the desired location and using a dental floss tool to propagate the split up to the desired length. In both cases the propagation of the split can also be achieved by hand.

The method of stripping a ribbon in preparation of mass fusion splicing comprises the steps of splitting the ribbon into sub-units of a maximum of 12 fibers each (in cases of ribbons with more than 12 fibers) and stripping the resulting sub-units using commercially available tools (such as those available by Sumitomo and Fujikura).

The principles and features of the present invention will be more readily apparent form the following detailed description, read in conjunction with the accompanying drawings.

DETAILED DESCRIPTION

Figure 1:
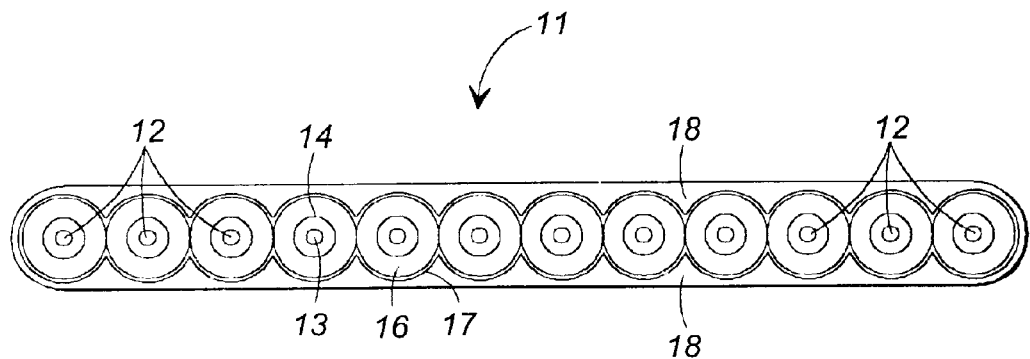
FIG. 1 is a cross-section elevation view of an optical fiber ribbon having the matrix of the present invention.

In FIG. 1 there is shown, in cross-section, an optical fiber ribbon 11 having twelve optical fibers 12 arrayed in side-by-side parallel relationship in a single plane. Each of the fibers 12 comprises a core 13 and a cladding 14, a first, inner coating 16 and a second, outer coating 17, and the several fibers 12 are held together in their planar array by a matrix 18. Although not visible in FIG. 1, outer coating or layer 18 has an identifying colored ink thereon for facilitating identification of each of the fibers relative to the others. It is to be understood that instead of first and second layers 16 and 17, each fiber may have only a single layer instead of the two shown, and, further, that layer or coating 17 may have a colorant incorporated therein. It is virtually a necessity that the coloring layer, whatever its make-up, i.e., ink, dye, or colorant incorporation not be removed or otherwise obscured when the matrix 18 is removed to gain access to the fibers. The material of matrix 18 and the surface of the color identifier is selected to have an interfacial bonding characteristic such that the bonding interface between the two materials is weaker than the bonding interface of the ink or colorant to the coating 17 on the fiber, or the coating 16 if coating 17 is not used. Such a desideratum can be achieved, for example, by the application of a release agent, not shown, over the ink or colorant, or by the inclusion of a release agent in the ink or colorant or matrix. The release agent creates a weak boundary layer at the interface of the matrix material and the colorant material. Further, to this end, the surface energy (surface tension) of the ink and matrix materials should be 20–35 mJ/m². By adjusting the surface energies, a course adjustment can be made to the ink-to-matrix adhesion. A fine adjustment of this adhesion parameter can be made by adjusting the surface cure of the ink. A measure of the surface cure is given by the residual acrylate unsaturation (RAV) of a UV colored fiber, which should be lower than 20%. In practice, it has been found that a range of 2 to 17% works best. A greater RAU leads to increased matrix adhesion.

UV curable matrix bonding material comprises, for example, a mixture comprising a resin, a diluent, and a photoinitiator. The resin may include an aliphatic or aromatic urethane acrylate and/or an epoxy acrylate/methacrylate. The diluent may comprise monofunctional or multifunctional acrylic acid esters having a molecular weight of 100–1000 Dalton. For the photoinitiator, the composition may include ketonic compounds such as 1-hydroxycyclohexyl phenyl ketone, diethoxyacetophenone, acetophenone, benzophenone, benzoin, anthraquinone, and benzil dimethyl ketal. In composition, the bonding matrix may include 50–90 percent weight resin, 5 to 10 percent diluents, and 1 to 10 percent photoinitiator. Additives containing silicon (Si) or fluorine (F) atoms may be added to improve the release properties of the bonding material. A UV curable coloring material (UV ink) is a mixture similar to that of the UV bonding material with the addition of pigments to achieve the desired color.

Figure 2:
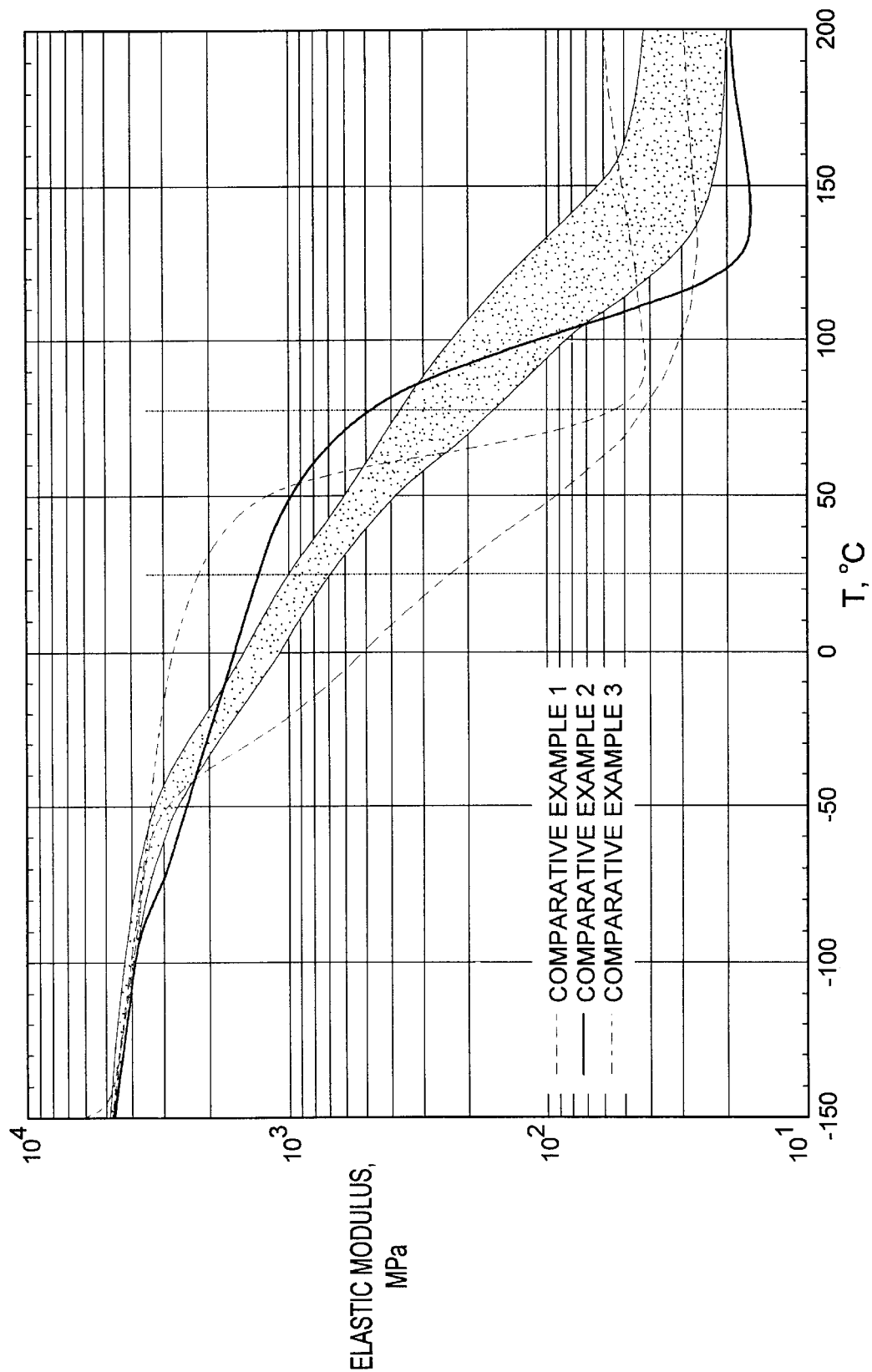
FIG. 2 is a comparison chart of elastic modulus versus temperature of the bonding material of the invention and several commercially available bonding materials.

Another important property of the matrix bonding material is its modulus as related to temperature. Ideally, the modulus should not change significantly over the expected temperature range of operation, generally considered as −40° F. to 180° F. Where the fiber has a dual coating, layers 16 and 17, inner layer 16 generally has a modulus of about 1 MPa at room temperature and the outer layer has a modulus of approximately 1 GPa at room temperature. The matrix material 18 is a UV curable bonding material which has a modulus greater than 1 MPa, preferably in the range of 600–1200 MPa at room temperature. A higher modulus material may be used when the inner layer 16 comprises a relatively low modulus material. If the modulus is relatively high, thereby insuring sufficient mechanical strength, the release agent insures an easy release between the fiber and the colorant so that the colorant remains with the fiber where the matrix is removed. FIG. 2 is a graph of a desired matrix bonding material elastic modulus versus temperature characteristic (gray area) as opposed to the modulus versus temperature characteristic of prior art matrix bonding material.

As can be seen in FIG. 2, the matrix material of the invention has, at room is temperature (25° C.) an elastic modulus of approximately 700 to 1000 MPa. As pointed out hereinbefore, the range at room temperature can extend from 600 to 1200 MPa. This range is highly satisfactory for accessing the fibers without destroying or weakening the ribbon. Examples 2 and 3 show too high a modulus at room temperature, which makes it more difficult to break out the fibers, while example 1 has an extremely low modulus, where accessing the fibers can seriously weaken the ribbon. Also, as pointed out hereinbefore, the elastic modulus should be relatively high at stripping temperatures (75° C.–150° C.). It can be seen from FIG. 2 that the modulus of the material of the invention is, over almost the entire stripping temperature range, higher than the examples 1, 2 and 3. Further, over the design range (−50° C.–85° C.) the prior art materials undergo steep dielines in modulus, as well as relatively abrupt changes therein, while the elastic modulus of the material of the invention undergoes a smooth predictable decrease.

The remaining portion of the disclosure is directed to methods of accessing or breaking out fibers from the ribbon, in which the importance of the matrix properties, as enumerated hereinbefore, become apparent.

Figure 3:
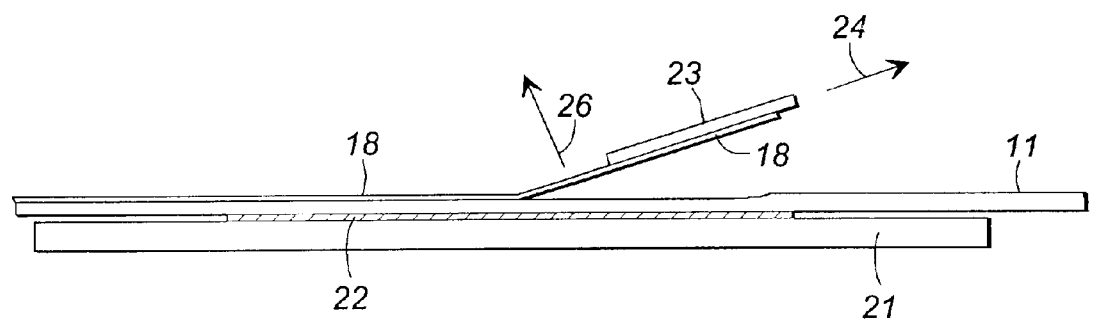
FIG. 3 is a depiction of the process of the invention in a first embodiment thereof.

FIG. 3 depicts the method of achieving the desired separation so that individual fibers may be accessed for splicing or other operations thereon. As shown in FIG. 3, the fiber ribbon 11 which is to be accessed is affixed to a flat (i.e., infinite radius of curvature) plate 21 by means of a double sided adhesive tape 22. Prior to the ribbon 11 being affixed, it can be, although not absolutely necessarily, pre-wiped with a textured pad to introduce stresses and cracks therein and then it is immersed in a softening agent, preferably an ethanol bath, which covers the area in which break-out is to occur. Alternatively, the designated area may be covered with an ethanol gel. The ethanol functions to cause the matrix material to swell and soften, and to weaken the bond between the matrix 18 and the outer coating 17 and its colorant, i.e., ink. As pointed out before, the fiber may have only a single coating layer 16, with the colorant applied thereto or incorporated therein. After the matrix 18 has been softened, which preferably takes less than 10 minutes, a pulling member such as a card, adhesive tape 23, or other flexible member, is affixed to the matrix 18 and the matrix 18 is pulled from one side of ribbon 11 by means of a back tension in the direction of arrow at approximately a 30° angle. This angled back tension has a vertical component as indicated by the arrow 26, which component separates the matrix from one side of the ribbon 11, as shown in FIG. 3. After the matrix 18 has been separated from the ribbon 11 in the desired location, the ribbon is turned over and the process is repeated for the other side of the ribbon 11 or the fibers themselves may be lifted from the matrix that remains attached to the tape. What is then left are the fibers themselves with their coating or coatings 16 and 17 and the colorant intact. The fiber or fibers to be operated on (as by splicing) are then wiped clean of any remnant matrix material, by the use of, for example, reagent grade isopropyl alcohol.

In the process just described, the fibers remain flat/straight at all times and, their transmission of signals during the process is unaffected thereby.

Figure 4:
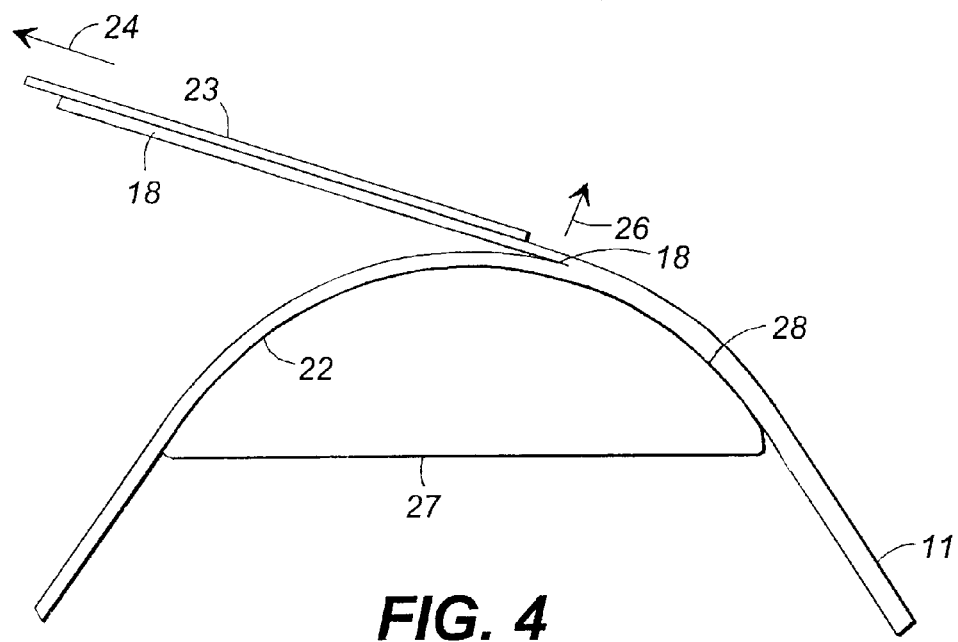
FIG. 4 is a depiction of a variation of the process of FIG. 3 using an especially designed tool or fixture.

In FIG. 4 there is shown a tool 27 that can be carried in the tool kit of the installer, and that presents a smooth curved surface 28 upon which the ribbon 11 is affixed by the double sided tape 22. The main limitation on the surface 28 is that its radius of curvature substantially exceed the critical bend radius of the fibers, thereby preventing the introduction of losses or distortions resulting from too sharp bending of the fibers. In all other respects, the process of the invention is the same as for that shown in FIG. 3.

Figure 5:
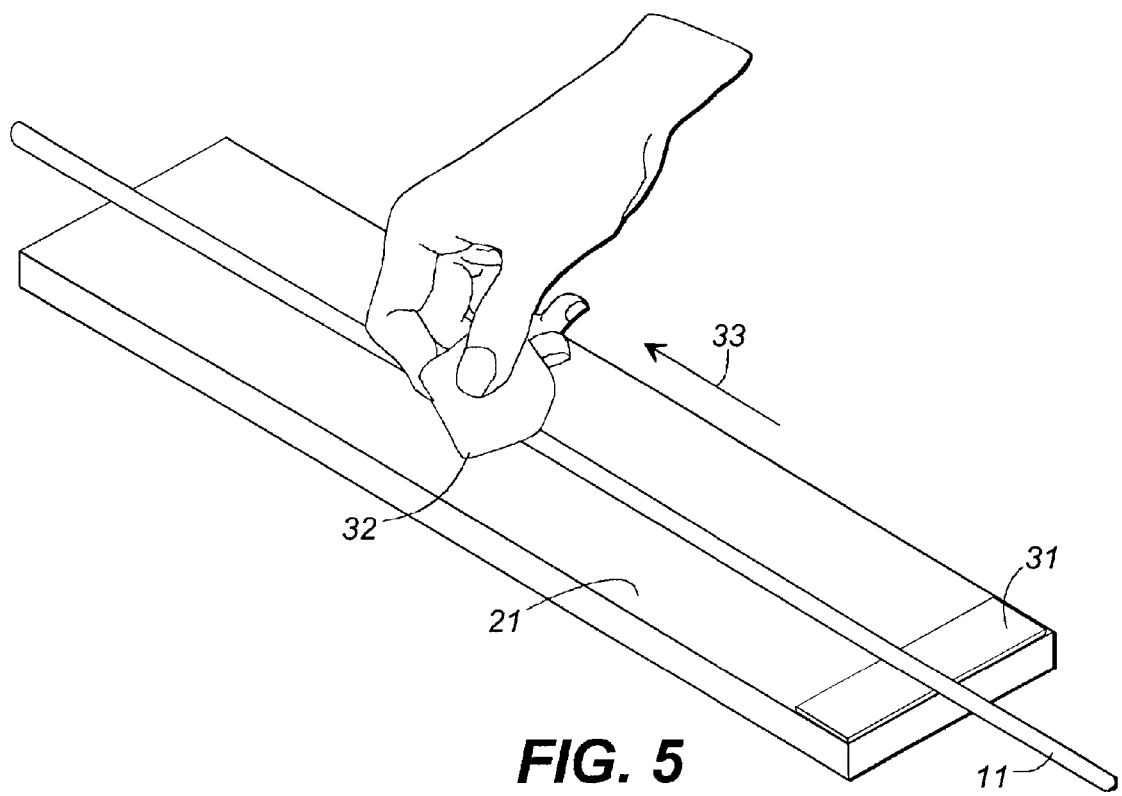
FIG. 5 is a depiction of the process of the invention in a second embodiment thereof.

FIG. 5 illustrates a second preferred embodiment of the process of the invention which, as is the first embodiment of FIGS. 3 and 4, includes the steps of treating the matrix material 18 with ethanol, then laying the ribbon on a smooth flat surface of a flat plate 21. The double-sided adhesive tape 22 of FIG. 3 is not absolutely necessary, although it may be used if desired. Preferably, a small adhesive patch 31 serves to anchor the ribbon 11 to the plate 21. Instead of the matrix 18 being pulled from the ribbon 1 as in the first embodiment, the matrix 18 is removed by being rubbed with a textured cloth or pad 32 in which it is stroked in the direction of the arrow 33. The pad 32 may be, for example, a polyethylene pad which has a textured surface that, in effect, abrades the matrix 18 but is soft enough that it does not abrade the fiber coating 17 nor the colorant layer or coating. It is usually the case that the entire section of the matrix 18 may be removed without the necessity of turning the ribbon over. On the other hand, as an additional assurance that the material 18 may be completely removed, the ribbon 11 may be turned over and the rubbing step repeated. After the rubbing step, the fibers may be cleaned by the use of, for example, reagent grade isopropyl alcohol, which does not affect the colorant.

Figure 6:
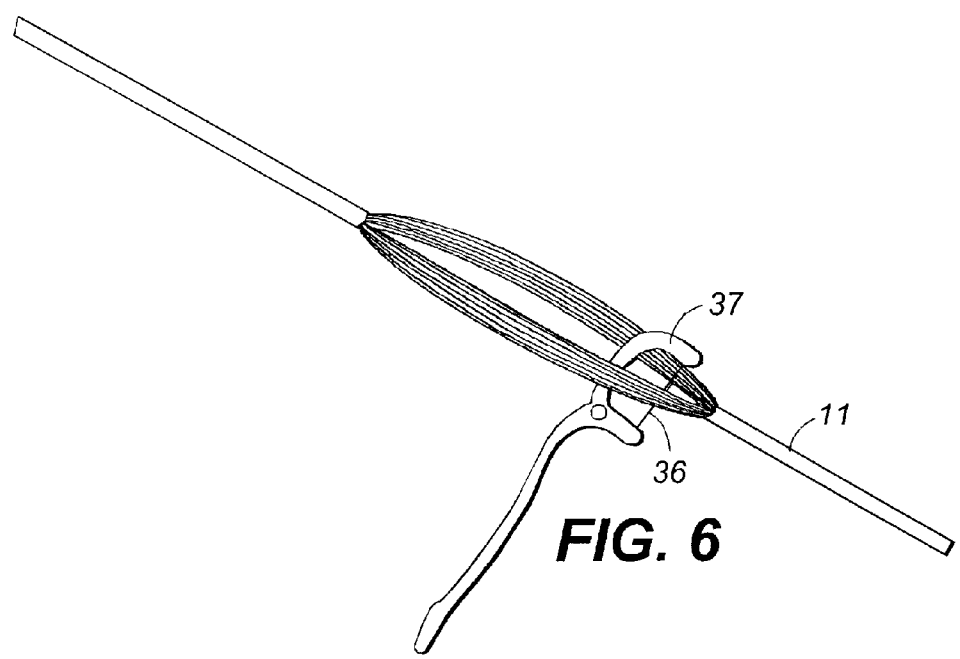
FIG. 6 is a depiction of single fiber/sub-unit separation using a flexible, cord like member or tool.

In many cases it may be desirable to access only one or two fibers from the ribbon. In that case, any of the foregoing procedures may be used to remove the bonding matrix and thus access all of the fibers in a short portion of the, e.g., approximately 5 cm. Then, as shown in FIG. 6, any desired individual fiber or fibers or integral sub-unit comprising a plurality of fibers may be separated further along the ribbon 11 by using a thin, flexible cord-like member 36 such as dental floss, held in a tool or holder 37. The member 37 and cord 36 are inserted between the fiber and/or sub-unit to be separated and moved parallel to the longitudinal dimension of the ribbon 11, thereby freeing the fiber from the bonding matrix 18 without damage thereto or disrupting the mechanical integrity of the adjacent sub-units or without inducing bit errors in the actively transmitting fibers or adjacent sub-units.

From the foregoing, it can be seen that the method of the present invention makes break-out or individual fiber access in a ribbon fiber possible without introducing losses or signal distortions in the transmitting fibers. It is not necessary to stop signal transmission in performing the break-out, and the break-out, itself, is relatively simple and easy to perform.

The invention and the principles thereof have been discussed with regard to a single matrix material, which is usable with virtually any commercial stripper. It is conceivable that future methods or apparatus may require or operate best with two matrix materials, for example, without departing from the principles set forth in the foregoing.

In concluding the detailed description, it should be noted that it will be obvious to those skilled in the art that many variations and modifications may be made to the preferred embodiment without substantial departure from the principles of the present invention. All such variations and modifications are intended to be included herein as being within the scope of the present invention. Further, in the claims hereafter, the corresponding structures, materials, and acts and equivalents of all means or step plus function elements are intended to include any structure, material, or acts for performing the functions with other claimed elements or steps as specifically claimed.

We claim:

1. An optical fiber ribbon comprising:

a plurality of substantially parallel optical fibers forming a longitudinally extending array, each of said fibers having at least one layer of a coating material;

an ultra violet curable matrix bonding material filling interstices between the adjacent fibers for bonding the fiber array in a ribbon form, said matrix material having an elastic modulus at room temperature of approximately 25°–30° C. of 600–1200 MPa, an elastic modulus at 100° C. of 100–280 MPa, an elastic modulus at temperatures greater than 170° C. of 15–45 MPa, a surface tension of approximately 20–35 mJ/m$^2$ and a swellability in ethanol of more than 15% by volume; and at least one of said fibers has a color indentifier material overlying said coating material, said color identifier material having a surface tension of approximately 20–35 mJ/m$^2$.

2. An optical fiber ribbon as claimed in claim 1 wherein said matrix material has the property of being swellable in ethanol to a swelling plateau of more than fifteen percent by volume in approximately twenty minutes or less.

3. An optical fiber ribbon as claimed in claim 1 wherein said matrix material has the property of being swellable in cleaning solvent to less than five percent by volume in approximately twenty-four hours.

4. An optical fiber ribbon as claimed in claim 2 wherein said color identifier material comprises an acrylate and the residual acrylate unsaturation of the colored fiber surface is within the range of two to seventeen percent.

* * * * *